(12) United States Patent
Oshima (10) Patent No.: US 12,199,498 B2
(45) Date of Patent: Jan. 14, 2025

(54) POWER SOURCE DEVICE AND IMAGE FORMING APPARATUS

(71) Applicant: CANON KABUSHIKI KAISHA, Tokyo (JP)

(72) Inventor: Mitsunori Oshima, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 18/224,123

(22) Filed: Jul. 20, 2023

(65) Prior Publication Data

US 2024/0088777 A1  Mar. 14, 2024

(30) Foreign Application Priority Data

Sep. 13, 2022 (JP) ................. 2022-145073

(51) Int. Cl.
*G03G 15/00* (2006.01)
*H02M 1/08* (2006.01)
*H02M 1/088* (2006.01)
*H02M 5/293* (2006.01)

(52) U.S. Cl.
CPC ............ *H02M 1/083* (2013.01); *G03G 15/80* (2013.01); *H02M 1/088* (2013.01); *H02M 5/2932* (2021.05)

(58) Field of Classification Search
USPC ........................................................ 399/88
See application file for complete search history.

(56) References Cited

U.S. PATENT DOCUMENTS

| | | | |
|---|---|---|---|
| 6,898,089 B2 | 5/2005 | Oates | |
| 9,501,010 B2 | 11/2016 | Itoh | |
| 2003/0095424 A1 | 5/2003 | Oates | |
| 2016/0026130 A1 | 1/2016 | Itoh et al. | |
| 2017/0005585 A1* | 1/2017 | Shimura | ............... G03G 15/80 |
| 2019/0131879 A1 | 5/2019 | Oshima | |
| 2022/0368237 A1 | 11/2022 | Oshima et al. | |

FOREIGN PATENT DOCUMENTS

| | | |
|---|---|---|
| JP | 2002-247855 A | 8/2002 |
| JP | 2003-528562 A | 9/2003 |
| JP | 2016-029460 A | 3/2016 |
| JP | 2019-033654 A | 2/2019 |

* cited by examiner

*Primary Examiner* — Quana Grainger
(74) *Attorney, Agent, or Firm* — Venable LLP (57) ABSTRACT

A power source device includes first FET of which a source is connected to LIVE phase, second FET of which a source is connected to a drain of the first FET, third FET of which a source is connected to NEUTRAL phase, fourth FET of which a source is connected to a drain of the third FET, first capacitor connected between the source and the drain of the first FET, second capacitor serially connected between the drain of the second FET and the drain of the fourth FET, third capacitor connected between the source and the drain of the third FET, fourth capacitor connected between the LIVE and NEUTRAL phases, a detector to detect potentials of the LIVE and NEUTRAL phases, a controller controls the FETs based on a detecting result by the detector, and an inductive load connected between the drains of the first and third FETs.

22 Claims, 9 Drawing Sheets

POWER SOURCE DEVICE AND IMAGE FORMING APPARATUS

FIELD OF THE INVENTION AND RELATED ART

The present invention relates to a power source device and an image forming apparatus and, for example, an increasing of an efficiency of a switching power source.

In the switching power source that converts an alternating current (AC) voltage of an AC power source, etc. to a direct current (DC) power or an AC power, the AC voltage is generally rectified and smoothed by using a diode bridge and a smoothing capacitor or a power factor correction circuit, and then switching is performed (see, for example, Japanese Patent Application Laid-Open No. 2016-029460).

However, in the switching power source, an input current becomes greater as an output power goes greater, therefore losses in the diode bridge or the power factor correction circuit becomes greater as the output power goes greater. Therefore, there is a problem that cost and a board area are increased since it is needed to strengthen a heat sink, etc., that cools the diode bridge or the power factor correction circuit as the output power of the switching power source goes greater.

The present invention is conceived under such a situation as described above and an object of the present invention is to configure an efficient switching power source without using diode bridges.

SUMMARY OF THE INVENTION

In order to solve the problem described above, the present invention is provided with the following configuration.

(1) A power source device comprising: a first switching element of which a first terminal is connected to a path of a first polarity of an AC power source; a second switching element of which a first terminal is connected to a second terminal of the first switching element; a third switching element of which a first terminal is connected to a path of a second polarity of the AC power source; a fourth switching element of which a first terminal is connected to a second terminal of the third switching element; a first capacitor connected between the first terminal and the second terminal of the first switching element; a second capacitor serially connected between the second terminal of the second switching element and the second terminal of the fourth switching element; a third capacitor connected between the first terminal and the second terminal of the third switching element; a fourth capacitor connected between the path of the first polarity and the path of the second polarity; a detecting portion configured to detect which of the path of the first polarity and the path of the second polarity is higher potential; a control portion configured to control the first switching element, the second switching element, the third switching element and the fourth switching element based on a detecting result by the detecting portion; and an inductive load connected between the second terminal of the first switching element and the second terminal of the third switching element.

(2) An image forming apparatus for forming an image on a recording material comprising a power source device, wherein the power source device includes: a first switching element of which a first terminal is connected to a path of a first polarity of an AC power source; a second switching element of which a first terminal is connected to a second terminal of the first switching element; a third switching element of which a first terminal is connected to a path of a second polarity of the AC power source; a fourth switching element of which a first terminal is connected to a second terminal of the third switching element; a first capacitor connected between the first terminal and the second terminal of the first switching element; a second capacitor serially connected between the second terminal of the second switching element and the second terminal of the fourth switching element; a third capacitor connected between the first terminal and the second terminal of the third switching element; a fourth capacitor connected between the path of the first polarity and the path of the second polarity; a detecting portion configured to detect which of the path of the first polarity and the path of the second polarity is higher potential; a control portion configured to control the first switching element, the second switching element, the third switching element and the fourth switching element based on a detecting result by the detecting portion; and an inductive load connected between the second terminal of the first switching element and the second terminal of the third switching element.

Further features of the present invention will become apparent from the following description of exemplary embodiments with reference to the attached drawings.

DESCRIPTION OF THE EMBODIMENTS

In the following, modes for carrying out the present invention will be described in detail based on embodiments with reference to the drawings.

Embodiment 1

A switching power source 100, which is a power source device of an Embodiment 1, is an inverter that supplies AC power to an insulated heated member. The switching power source 100 is characterized in applying a square wave voltage of a predetermined frequency to the heated member by directly switching an AC voltage of an AC power source 10 without using diode bridges. A circuit configuration of the switching power source 100 will be described below, followed by a description of an operation of the switching power source 100.

[Switching Power Source 100]

Figure 1:
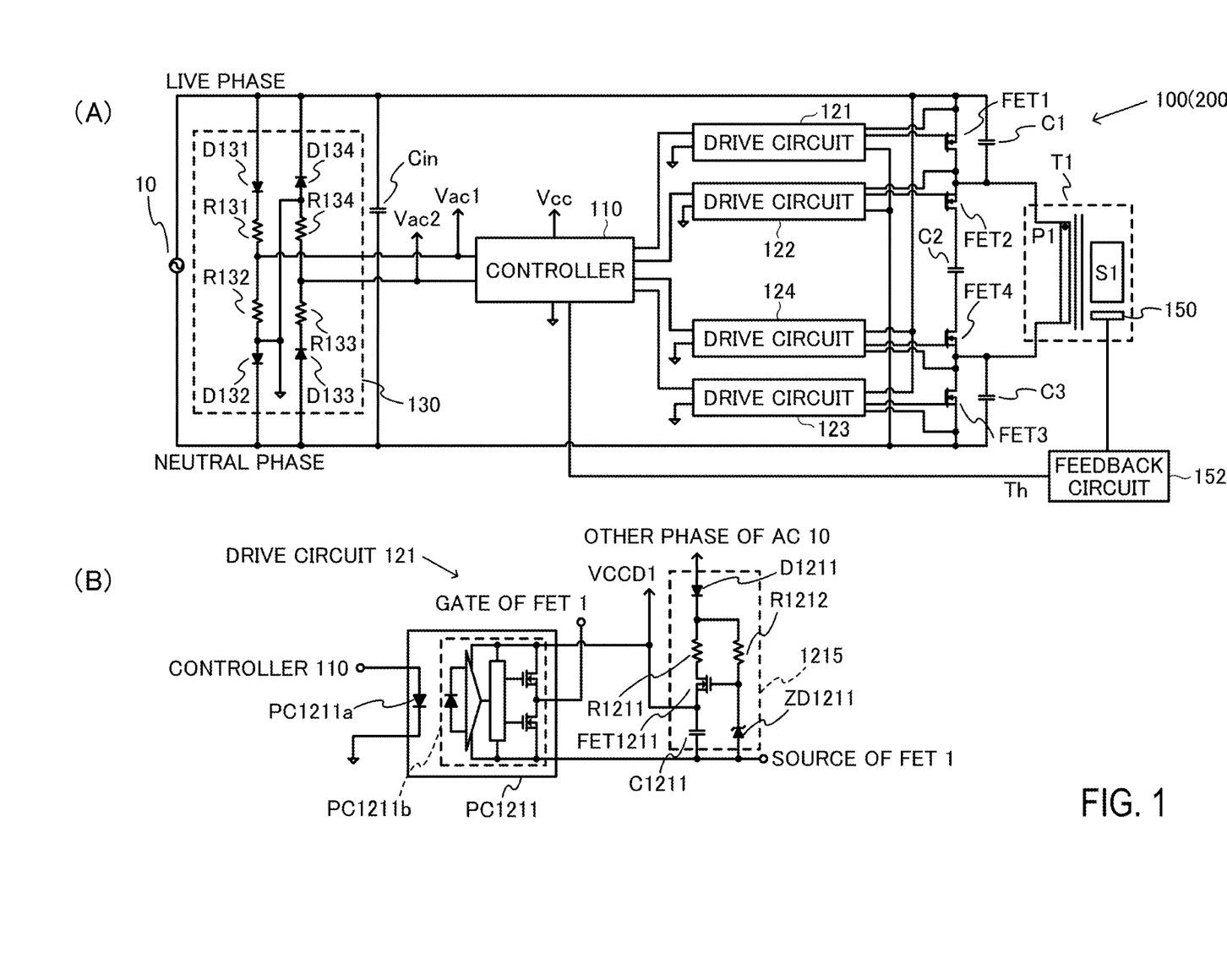
FIG. 1, part (A) and part (B), is a schematic view of a switching power source of an Embodiment 1.

First, the circuit configuration of the switching power source 100 will be described using the part (A) of FIG. 1. The switching power source 100 includes, on a primary side, a capacitor for power regeneration Cin, which is a fourth capacitor, and a load of inductivity (hereinafter referred to as inductive load) T1. The switching power source 100 includes, on the primary side, a field effect transistor 1 (hereinafter referred to as FET1), FET2, FET3, FET4, and a control portion 110, that switches the AC voltage of the AC power source 10. The control portion 110 controls the FET1, which is a first switching element, the FET2, which is a second switching element, the FET3, which is a third switching element, and the FET4, which is a fourth switching element. Incidentally, the FET1, the FET2, the FET3 and the FET4 are provided with a source terminal, which is a first terminal, and a drain terminal, which is a second terminal, respectively.

The switching power source 100 is provided with a drive circuit 121 that drives the FET1, a drive circuit 122 that drives the FET2, a drive circuit 123 that drives the FET3, and a drive circuit 124 that drives the FET4. The switching power source 100 is provided with a voltage detecting circuit 130 that detects the AC voltage of the AC power source 10, a capacitor for voltage clamping C2, which is a second capacitor, a capacitor for voltage resonance C1, which is a first capacitor, and a capacitor for voltage resonance C3, which is a third capacitor. The control portion 110 controls the FET1, the FET2, the FET3 and the FET4 to supply power to the heated member S1 on a secondary side insulated from the AC power source 10 by the inductive load T1 so as to keep temperature of the heated member S1 constant, for example.

The inductive load T1 is constituted by an inductor on the primary side (hereinafter referred to as a primary inductor P1) and the heated member S1 on the secondary side. The primary inductor P1 and the heated member S1 are magnetically coupled. The power is provided from the primary inductor P1 to the heated member S1 by a switching operation of the FET1, the FET2, the FET2 and the FET4. As electric power is supplied from the primary inductor P1, electric current flows to the heated member S1 and the heated member S1 is heated by Joule heat due to the electric resistance of the heated member S1 itself.

Incidentally, in the Embodiment 1, an inductive load T1 in which the primary side and the secondary side are insulated is described as an example, however, depending on a safety design of an apparatus in which the switching power source is used, a configuration equivalent to a reinforced insulation or a double insulation for safety standards is not mandatory between the primary inductor P1 and the heated member S1. In addition, the switching power source 100 is used as an ACAC inverter, however, it may be used as an ACDC converter by replacing the heated member S1 with a secondary winding, connecting a rectifying element and a capacitor, and being provided with a unit to feed back an output voltage. In other words, the inductive load is not limited to the inductor on the primary side and the heated member on the secondary side insulated from the inductor as described above. A transformer provided with a primary winding and a secondary winding may be used as the inductive load.

The FET1, the FET2, the FET3 and the FET4, the capacitor Cin and the capacitor C2 are connected so as to constitute an active clamp circuit. In the FET1, which is a low-side FET, the source terminal is connected to a LIVE phase (path of a first polarity), which is one phase (first polarity) of the AC power source 10, and the source terminal of the FET2, which is a high-side FET, is connected to the drain terminal of the FET1. In addition, the capacitor for voltage clamping C2 is connected to the drain terminal of the FET2.

Similarly, in the FET3, which is a low-side FET, the source terminal is connected to a NEUTRAL phase (path of a secondary polarity), which is the other phase (second polarity) of the AC power source 10, and the source terminal of the FET4, which is a high-side FET, is connected to the drain terminal of the FET3. In addition, the capacitor C2 is connected to the drain terminal of the FET4. In other words, the capacitor C2 is serially connected between the drain terminal of the FET2 and the drain terminal of the FET4. Thus, the FET1, the FET2, the FET3 and the FET4 are connected so as to be a configuration of symmetry about the capacitor C2.

In addition, between the LIVE phase and the NEUTRAL phase of the AC power source 10, the capacitor for power regeneration Cin is connected in parallel with the FET1, the FET2, the FET3, the FET4 and the capacitor C2. A primary inductor P1 of the inductive load T1 is connected between the drain terminal of the FET1, which is the low-side FET, and the drain terminal of the FET3. The FET1, the FET2, the FET3 and the FET4 supply power to the load by performing an active clamp operation. However, unlike general ACDC converters of active clamping method provided with the diode bridges, it is necessary to control each FET according to a phase of the AC power source 10.

Here, the FET3 is positioned downstream of flowing current during a period when the LIVE phase of the AC power source 10 has a higher potential than the NEUTRAL phase of the AC power source 10, and the FET1 is positioned downstream of flowing current during a period when the NEUTRAL phase of the AC power source 10 has a higher potential than the LIVE phase of the AC power source 10. For this reason, the FET1 and the FET3 are called as the low-side FET, respectively. Details of a control method of the FET1, the FET2, the FET3 and the FET4 will be described using FIG. 2, the part (A) of FIG. 3 and the part (B) of FIG. 3.

The capacitor for voltage resonance C1 connected between the drain terminal and the source terminal of the FET1 is connected in order to reduce power consumption of the FET1. The capacitor for voltage resonance C3 connected between the drain terminal and the source terminal of the FET3 is connected in order to reduce power consumption of the FET3. In addition, the FET1, the FET2, the FET3 and the FET4 are all N channel metal oxide film semiconductor field effect transistors (MOSFETs).

Incidentally, in the switching power source 100 of the Embodiment 1, the FET is used as an element for switching the AC voltage of the AC power source 10, however, the present invention is not limited to this configuration. For example, instead of the FET, an insulated gate bipolar transistor (hereinafter referred to as IGBT) may be used and a reverse diode may be connected in parallel. Incidentally, the IGBT is provided with an emitter terminal, which is a first terminal, and a collector terminal, which is a second terminal. Unlike the FET, the IGBT is not provided with a parasitic diode (body diode), therefore it is necessary to be connected to the reverse diode externally. In a case where the reverse diode is connected to an N channel IGBT, an anode terminal of the reverse diode is connected to the emitter terminal of the IGBT, and a cathode terminal of the reverse diode is connected to the collector terminal of the IGBT.

The control portion 110 is operated by the power source Vcc and is a circuit for controlling a switching state of the FET1, the FET2, the FET3 and the FET4. Here, the switching state includes an ON state or an OFF state of the FET. The control portion 110 outputs signals to control the switching state of the FET1, the FET2, the FET3 and the FET4 to a drive circuit 121, a drive circuit 122, a drive circuit 123 and a drive circuit 124, respectively, based on a detection result by the voltage detecting circuit 130, i.e., voltage Vac1 and voltage Vac2 output from the voltage detecting circuit 130. Incidentally, the switching power source 100 may be provided with a feedback circuit 152 that feeds back temperature information of the heated member S1 detected by a detecting portion 150, which is a temperature detecting unit such as a thermistor, for example, that detects the temperature of the heated member S1, to the control unit 110. The control portion 110 may output the signals that control the switching state of the FET1, the FET2, the FET3 and the FET4 to the drive circuit 121, the drive circuit 122, the drive circuit 123 and the drive circuit 124, respectively, based on an output signal Th from the feedback circuit 152 in addition to the voltage Vac1 and the voltage Vac2.

The voltage detecting circuit 130, which is a detecting portion, is constituted by a diode D131, a diode D132, a diode D133 and a diode D134 and a resistor R131, a resistor R132, a resistor R133 and a resistor R134 and is a circuit for detecting an instantaneous value of the AC voltage of the AC power source 10. Specifically, in the diode D131, an anode terminal is connected to the LIVE phase of the AC power source 10, and a cathode terminal is connected to one end of the resistor R131. In the diode D132, a cathode terminal is connected to the NEUTRAL phase of the AC power source 10, and an anode terminal is connected to one end of the resistor R132. The other end of the resistor R131 is connected to the other end of the resistor R132, and a connection point of the resistor R131 and the resistor R132 is connected to the control portion 110 and outputs the voltage Vac1 to the control portion 110. A connection point between the anode terminal of the diode D132 and the resistor R132 is at the same potential as a reference potential of the control portion 110.

In the diode D134, a cathode terminal is connected to the LIVE phase of the AC power source 10, and an anode terminal is connected to one end of the resistor R134. In the diode D133, an anode terminal is connected to the NEUTRAL phase of the AC power source 10, and a cathode terminal is connected to one end of the resistor R133. The other end of the resistor R134 is connected to the other end of the resistor R133, and a connection point of the resistor R133 and the resistor R134 is connected to the control portion 110 and outputs the voltage Vac2 to the control portion 110. A connection point between the anode terminal of the diode D134 and the resistor R134 is at the same potential as a reference potential of the control portion 110.

During the period when the LIVE phase of the AC power source 10 has a higher potential than the NEUTRAL phase of the AC power source 10, the AC voltage of the AC power source 10 is rectified by the diode D131 and the diode D132, then is divided by the resistor R131 and the resistor R132, and is output as the voltage Vac1. On the other hand, during the period when the NEUTRAL phase has higher potential than the LIVE phase, the AC voltage of the AC power source 10 is rectified by the diode D133 and the diode D134, then is divided by the resistor R133 and the resistor R134, and is output as the voltage Vac2. The control portion 110 can detect the instantaneous value of the AC voltage of the AC power source 10 by being input (in other words, by detecting) the voltage Vac1 and the voltage Vac2. A reference potential of the voltage detecting circuit 130 is the same as the reference potential of the control unit 110.

[Drive Circuit]

The drive circuit 121, the drive circuit 122, the drive circuit 123 and the drive circuit 124 are circuits for driving the FET1, the FET2, the FET3 and the FET4, respectively. The drive circuit 121, the drive circuit 122, the drive circuit 123 and the drive circuit 124 have similar configurations, and details of each circuit will be described using the part (B) of FIG. 1. Incidentally, in the part (B) of FIG. 1, a configuration of the drive circuit 121 which drives the FET1 is described, however, configurations of the drive circuit 122, the drive circuit 123 and the drive circuit 124 are the same, therefore descriptions for the drive circuit 122, the drive circuit 123 and the drive circuit 124 will be omitted.

The drive circuit 121 is constituted by a photocoupler PC1211, a resistor R1211, a resistor R1212, a diode D1211, a Zener diode ZD1211, a FET1211, and a capacitor C1211. In the photocoupler PC1211, a light emitting side PC1211a is connected to the control portion 110, and a light receiving side PC1211b is connected to a gate terminal and the source terminal of the FET1. In addition, in the light receiving side PC of the photocoupler PC1211, a power source voltage VCCD1 is input. The light receiving side PC1211b of the photocoupler PC1211 is provided with two output terminals and one input terminal. The power source voltage VCCD1 is generated by the resistor R1211, the resistor R1212, the diode D1211, the Zener diode ZD1211, the FET1211, and the capacitor C1211. In other words, the resistor R1211, the resistor R1212, the diode D1211, the Zener diode ZD1211, the FET1211, and the capacitor C1211 function as a power source voltage generation circuit 1215.

The photocoupler PC1211 outputs the power source voltage VCCD1 between the gate terminal and the source terminal of the FET1 from the light receiving side PC1211b when a high-level signal is input to the light emitting side PC1211a. On the other hand, when a low-level signal is input to the light emitting side PC1211a of the photocoupler PC1211, voltage between the gate terminal and the source terminal of the FET1 becomes 0 V. Incidentally, a value of the power source voltage VCCD1 is determined by a Zener voltage of the Zener diode ZD1211.

The capacitor C1211 is a capacitor for charging the power source voltage VCCD1 of the photocoupler PC1211. In a case where a terminal voltage of the capacitor C1211 is less than a difference between the power source voltage VCCD1 and a gate threshold voltage of the FET1211, the FET1211 turns on and the capacitor C1211 is charged by the AC power source 10 via the resistor R1211 and the FET1211. On the other hand, in a case where the terminal voltage of the capacitor C1211 becomes more than the difference between the power source voltage VCCD1 and the gate threshold voltage of the FET1211, the Zener diode ZD1211 is broken down. As a result, the FET1211 is turned OFF as the voltage between the gate terminal and the source terminal of the FET1211 no longer exceeds the gate threshold voltage. The resistor R1212 is a resistor for limiting current flowing into the Zener diode ZD1211.

Here, a destination to which an anode terminal of the diodes D1211 is connected is either phase of the AC power source 10, and it depends on the drive circuit. In cases of the drive circuit 121 and the drive circuit 122, the anode terminal of the diodes D1211 is connected to the NEUTRAL phase (see the part (A) of FIG. 1). In cases of the drive circuit 123 and the drive circuit 124, the anode terminal of the diode D1211 is connected to the LIVE phase (see the part (A) of FIG. 1). Incidentally, in the switching power source 100 of the Embodiment 1, the photocoupler PC1211 and the power source voltage generation circuit 1215 are used to configure the drive circuit 121, however, the present invention is not limited to this configuration. For example, another element such as a driver IC or a pulse transformer may be used to configure the drive circuit.

[Control Method of the Switching Power Source]

Figure 2:
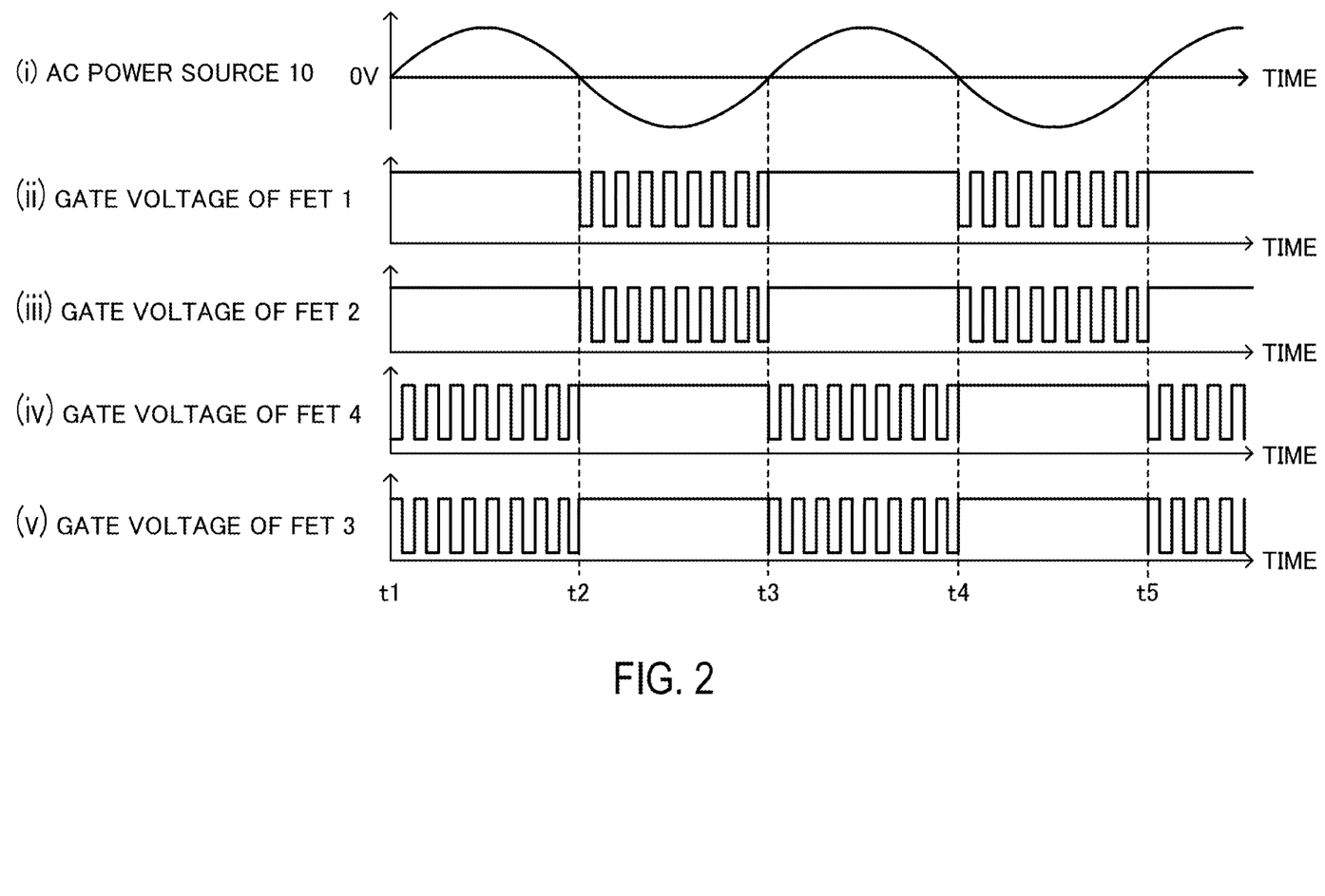
FIG. 2 is a view illustrating a control method of the switching power source of the Embodiment 1.

Next, a control method of the switching power source 100 will be described using FIG. 2, the part (A) of FIG. 3 and the part (B) of FIG. 3. FIG. 2 is a graph, in which a horizontal axis represents time, illustrating a transition of the AC voltage of the AC power source 10 and the gate voltages of the FET1, the FET2, the FET3 and the FET4. In FIG. 2, (i) shows a waveform of the AC voltage of the AC power source 10, and a voltage value of the AC power source 10 represents a potential of the LIVE phase viewed from the NEUTRAL phase. In FIG. 2, (ii) shows a waveform of voltage of the gate terminal of the FET1 (gate voltage) and (iii) shows a waveform of voltage of the gate terminal of the FET2 (gate voltage). In FIG. 2, (iv) shows a waveform of voltage of the gate terminal of the FET4 (gate voltage) and (v) shows a waveform of voltage of the gate terminal of the FET3 (gate voltage). Each of t1, t2, t3, t4 and t5 represents a timing.

The control portion 110 performs different controls depending on whether the voltage value of the AC power source 10 is positive or negative in order to realize the active clamp operation. During a period when the instantaneous value of the AC voltage of the AC power source 10 is positive, the control portion 110 controls so as to make the FET1 and the FET2 always be ON, i.e., so as to maintain the FET1 and the FET2 in the ON state. Here, the periods when the instantaneous value of the AC voltage is positive are periods such as from t1 to t2 and from t3 to t4. During the period when the instantaneous value of the AC voltage of the AC power source 10 is positive, due to the FET1 and the FET2 being always ON, the capacitor C2 and one end of the primary inductor P1 of the inductive load T1 are connected to a LIVE phase side of the capacitor for power regeneration Cin.

Figure 3:
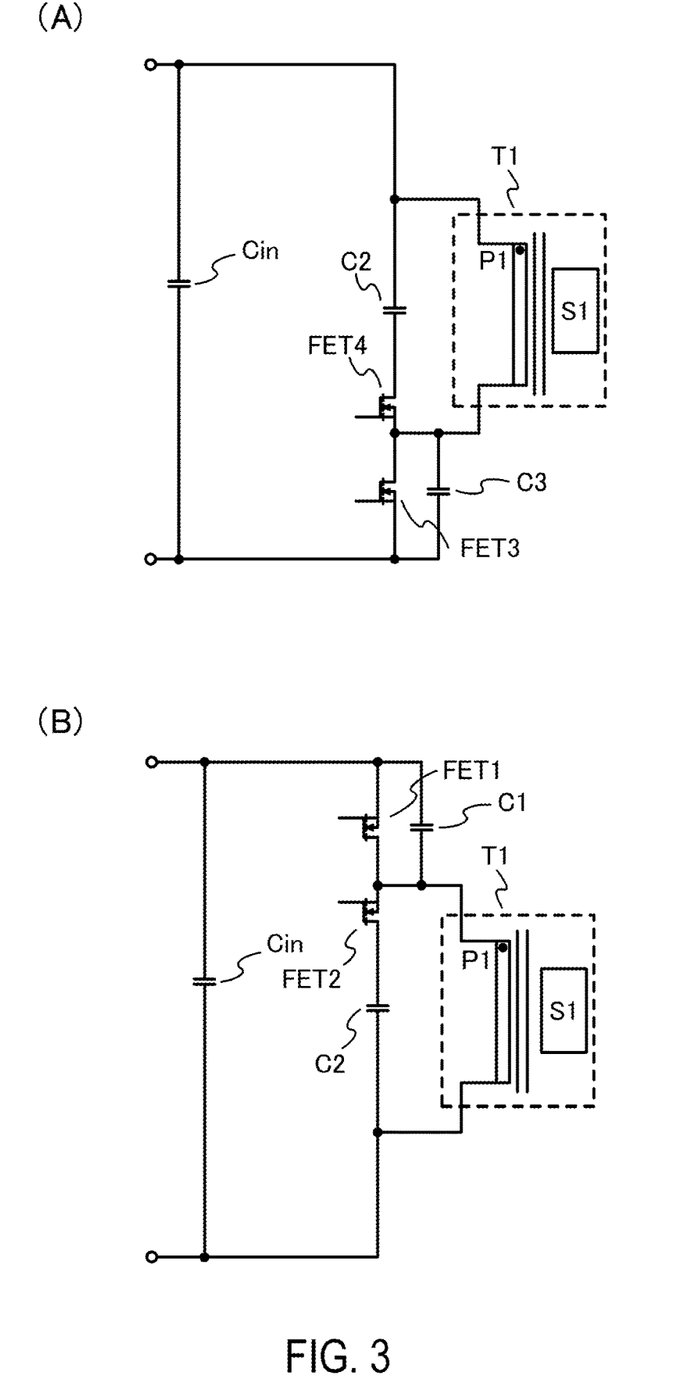
FIG. 3, part (A) and part (B), is a view illustrating an equivalent circuit of the switching power source of the Embodiment 1.

Part (A) of FIG. 3 is an equivalent circuit diagram illustrating a principal portion of the circuit in a state where the FET1 and the FET2 are always ON. As shown in the part (A) of FIG. 3, an active clamp circuit is constituted by the FET3, the FET4, the capacitor C2, the capacitor for power regeneration Cin, and the inductive load T1. Therefore, it is possible to realize the active clamp operation by controlling the FET4 in a complementary manner to the FET3 while controlling the FET3 with a pulse width modulation (PWM) at a frequency and an on-duty according to a load and an input voltage (voltage value of the AC power source 10) (PWM control). The control portion 110 controls the ON state or the OFF state of the FET3 and the FET4, i.e., performs switching controls, by outputting a PWM signal, for example, to the gate terminals of the FET3 and the FET4, which are third terminals of the FET3 and the FET4, respectively, via the drive circuit 123 and the drive circuit 124, respectively. The frequency and the on-duty of the PWM control described above are a frequency (switching frequency) and an on-duty of the PWM signals that the control portion 110 outputs to the gate terminals of the FET3 and the FET4 via the drive portion 123 and the drive portion 124, respectively. The same applies to the frequency and the on-duty of the PWM control in the following description.

In other words, the control portion 110 should control the switching of the FET4 and the FET3 in sections such as from t1 to t2 and from t3 to t4 as shown in (iv) and (v) of FIG. 2. Incidentally, the control portion 110 may control so as to provide a dead time in which two switching elements, i.e., the FET3 and the FET4 both are turned OFF. The control portion 110 controls so that the FET3 and the FET4 become in the ON state or the OFF state alternately, being provided with the dead time.

On the other hand, during a period when the instantaneous value of the AC voltage of the AC power source 10 is negative, the control portion 110 controls so as to make the FET3 and the FET4 always be ON, i.e., so as to maintain the FET3 and the FET4 in the ON state. Here, the periods when the instantaneous value of the AC voltage is negative are periods such as from t2 to t3 and from t4 to t5. During the period when the instantaneous value of the AC voltage of the AC power source 10 is negative, due to the FET3 and the FET4 being always on, the capacitor C2 and the other end of the primary inductor P1 of the inductive load T1 are connected to a NEUTRAL phase side of the capacitor for power regeneration Cin.

The part (B) of FIG. 3 is an equivalent circuit diagram illustrating a principal portion of the circuit in a state where the FET3 and the FET4 are always ON. As shown in the part (B) of FIG. 3, an active clamp circuit is constituted by the FET1, the FET2, the capacitor C2, the capacitor for power regeneration Cin, and the inductive load T1. Therefore, it is possible to realize the active clamp operation by controlling the FET1 and the FET2 in a complementary manner while controlling the FET1 and the FET2 with the PWM at a frequency and an on-duty according to a load and an input voltage (voltage value of the AC power source 10). In other words, the control portion 110 should control the switching of the FET2 and the FET1 in sections such as from t2 to t3 and from t4 to t5 as shown in (ii) and (iii) of FIG. 2. Incidentally, the control portion 110 may control so as to provide a dead time in which the FET2 and the FET1 both are turned OFF.

Incidentally, in the Embodiment 1, the voltage detecting circuit 130 is described as a circuit configuration that detects the instantaneous value of the AC voltage of the AC power source 10, however, the present invention is not limited to this configuration. A reason why the voltage detecting portion 130 is used in the Embodiment 1 is for the control portion 110 to take timings to perform the PWM control to the FET1, the FET2, the FET3 and the FET4 according to the voltage value of the AC power source 10. In a case where the control portion 110 performs the PWM control to the FET1, the FET2, the FET3 and the FET4 not according to the voltage value of the AC power source 10, i.e., not based on the voltage Vac1 and the voltage Vac2, but according to the load alone, it is sufficient for the control portion 110 to be able to determine which FET should be turned ON for a long period. Here, being ON for a long period refers to maintaining the ON state of the FET for a period of a half-wave of an AC voltage waveform (half cycle of one cycle). Therefore, instead of the voltage detecting circuit 130, a circuit that detects a phase and a zero-cross point of the AC power source 10 may be used as a detecting portion to take the timings. That is, the detecting portion may detect the zero-cross point where a potential of the path of the first polarity transits from a higher state to a lower state than a potential of the path of the second polarity, or where a potential of the path of the first polarity transits from the lower state to the higher state than the potential of the second polarity. In addition, the detecting portion may detect the phase of the AC voltage.

[Current Flowing into the FET During the Active Clamp Operation]

Figure 4:
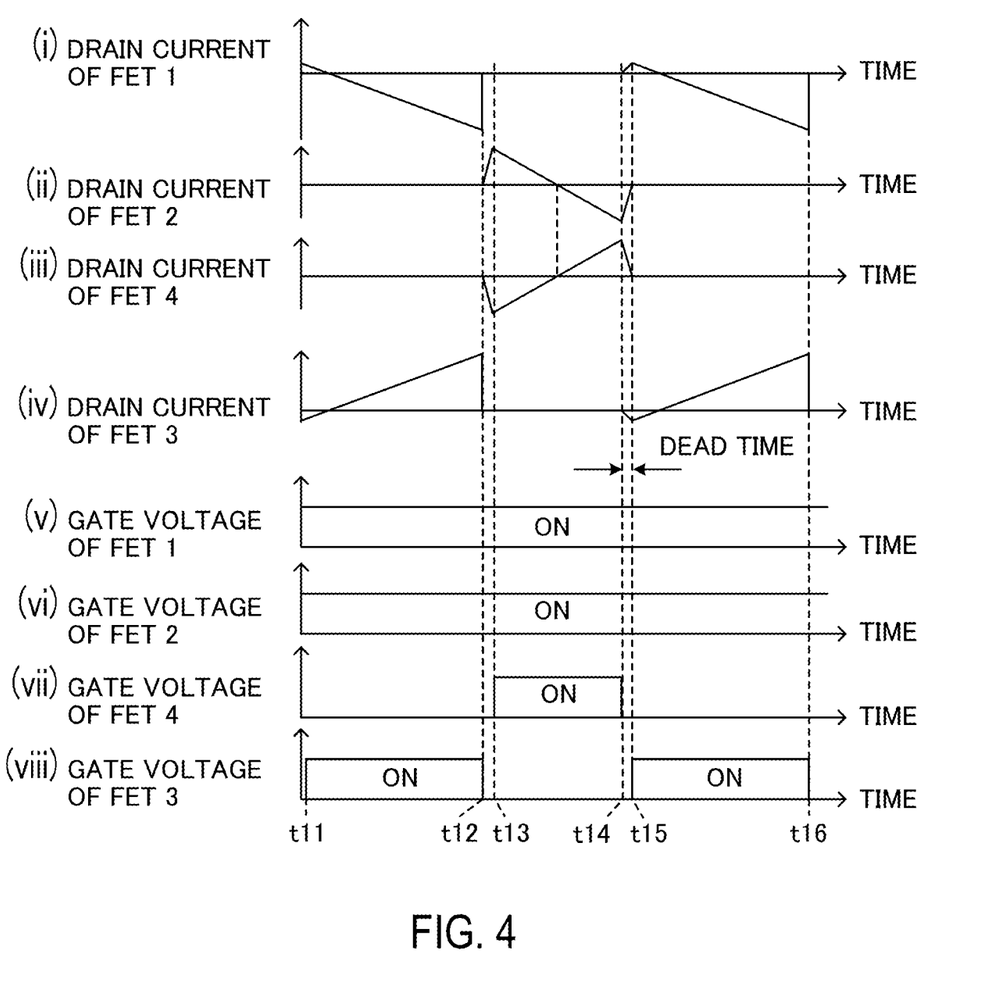
FIG. 4 is a view illustrating current waveforms and voltage waveforms of the switching power source of the Embodiment 1.
Figure 5:
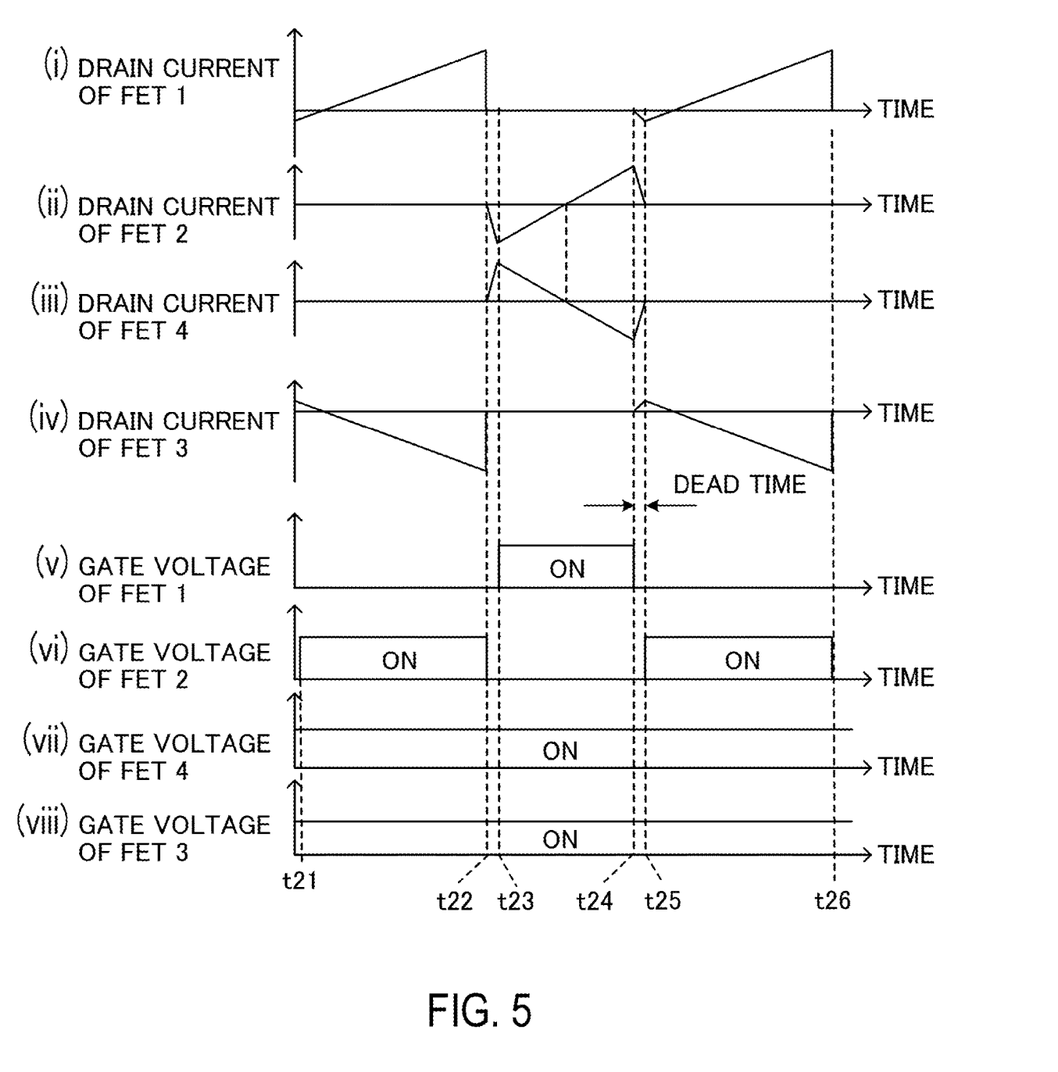
FIG. 5 is a view illustrating the current waveforms and the voltage waveforms of the switching power source of the Embodiment 1.

Current flowing into the FET1, the FET2, the FET3 and the FET4 during the active clamp operation will be described using FIG. 4 and FIG. 5. In both FIG. 4 and FIG. 5, (i) shows a waveform of a drain current of the FET1, (ii) shows a waveform of a drain current of the FET2, (iii) shows a waveform of a drain current of the FET4, (iv) shows a waveform of a drain current of the FET3. And (v) shows a waveform of the gate voltage of the FET1, (vi) shows a waveform of the gate voltage of the FET2, (vii) shows a waveform of the gate voltage of the FET4, and (viii) shows a waveform of the gate voltage of the FET3. Horizontal axes represent time in both Figures. In addition, each of t11, t12, t13, t14, t15 and t16 and each of t21, t22, t23, t24, t25 and t26 represents a timing. In addition, FIG. 4 shows waveforms during the period when the AC voltage of the AC power source 10 is positive in FIG. 2 (from t1 to t2, from t3 to t4, etc.), and FIG. 5 shows waveforms during the period when the AC voltage of the AC power source 10 is negative in FIG. 2 (from t2 to t3, from t4 to t5, etc.). Incidentally, in the drain current of each FET, a direction flowing from the drain terminal to the source terminal is defined as positive.

In FIG. 4, while the FET1 and the FET2 are always ON, the FET3 and the FET4 are complementarily controlled with the PWM with the dead time in between. Here, the FET3 is turned ON from t11 to t12 and from t15 to t16, and the FET4 is turned ON from t13 to t14. In addition, durations from t12 to t13 and from t14 to t15 are the dead times in which both the FET3 and the FET4 are turned OFF.

When the FET3 is turned ON, the drain current of the FET3 increases linearly. Then, when the FET3 is turned OFF and the dead time begins, current that was flowing into the primary inductor P1 of the inductive load T1 begins to flow into the FET4, specifically the body diode of the FET4, and the drain current of the FET4 increases in absolute value in a direction of negative. When the FET4 is subsequently turned ON, the current in the FET4 increases due to a resonance of the primary inductor P1 of the inductive load T1 and the capacitor C2. When the FET4 is turned OFF, power is regenerated to the capacitor for power regeneration Cin and the current begins to flow into the FET3. The drain currents in the FET3 and the FET4 are the same as those flowing in the low-side FET and the high-side FET in a typical active clamp circuit, therefore further detailed descriptions will be omitted. The current flowing into the FET1 has the same magnitude as the current flowing into the FET3, however, a direction of the positive and the negative are opposite because the connections of the FET1 and the FET3 are reversed. Similarly, the current flowing into the FET2 has the same magnitude as the current flowing into the FET4, however, a direction of the positive and negative are opposite.

In FIG. 5, contrary to FIG. 4, while the FET3 and the FET4 are always ON, the FET1 and the FET2 are complementarily controlled with the PWM. Here, the FET2 is turned ON from t21 to t22 and from t25 to t26, and the FET1 is turned ON from t23 to t24. In addition, durations from t22 to t23 and from t24 to t25 are the dead times in which both the FET1 and the FET2 are turned OFF. The current flowing into each FET is symmetrical in positive and negative with FIG. 4, therefore descriptions will be omitted.

As described above, in the switching power source 100 of the Embodiment 1, it is possible to realize the active clamp operation without using diode bridges by controlling the FET1, the FET2, the FET3 and the FET4 according to the phase of the AC power source 10.

By the way, in general switching power sources that use the diode bridges or power factor correction circuits, an input current becomes greater as an output power goes greater, therefore losses in the diode bridge, etc. also increase. On the other hand, in the switching power source 100 of the Embodiment 1, it is possible to suppress an increase of the loss due to a rectification of an input voltage even when the load becomes greater since it is possible for the switching power source 100 of the Embodiment 1 to perform an operation which is equivalent to a synchronous rectification of the AC power source 10. In addition, in the Embodiment 1, it is possible to reduce a number of elements compared to a case where the diode bridges are replaced with synchronous rectifier elements since the switching power source 100 of the Embodiment 1 is provided with the voltage detecting circuit 130 and the switching of the input voltage and the rectification of the AC power source 10 is performed by the same elements.

As described above, according to the Embodiment 1, it is possible to configure an efficient switching power source without using diode bridges.

Embodiment 2

A switching power source 200 of an Embodiment 2 differs from the switching power source 100 of the Embodiment 1 in a control method of the FET1, the FET2, the FET3 and the FET4. Hereinafter, the control method of the switching power source 200 will be explained. Incidentally, since the circuit configuration is the same as that of the switching power source 100 of the Embodiment 1, the same reference numerals are used and descriptions will be omitted.

[Control Method of the Switching Power Source]

Figure 6:
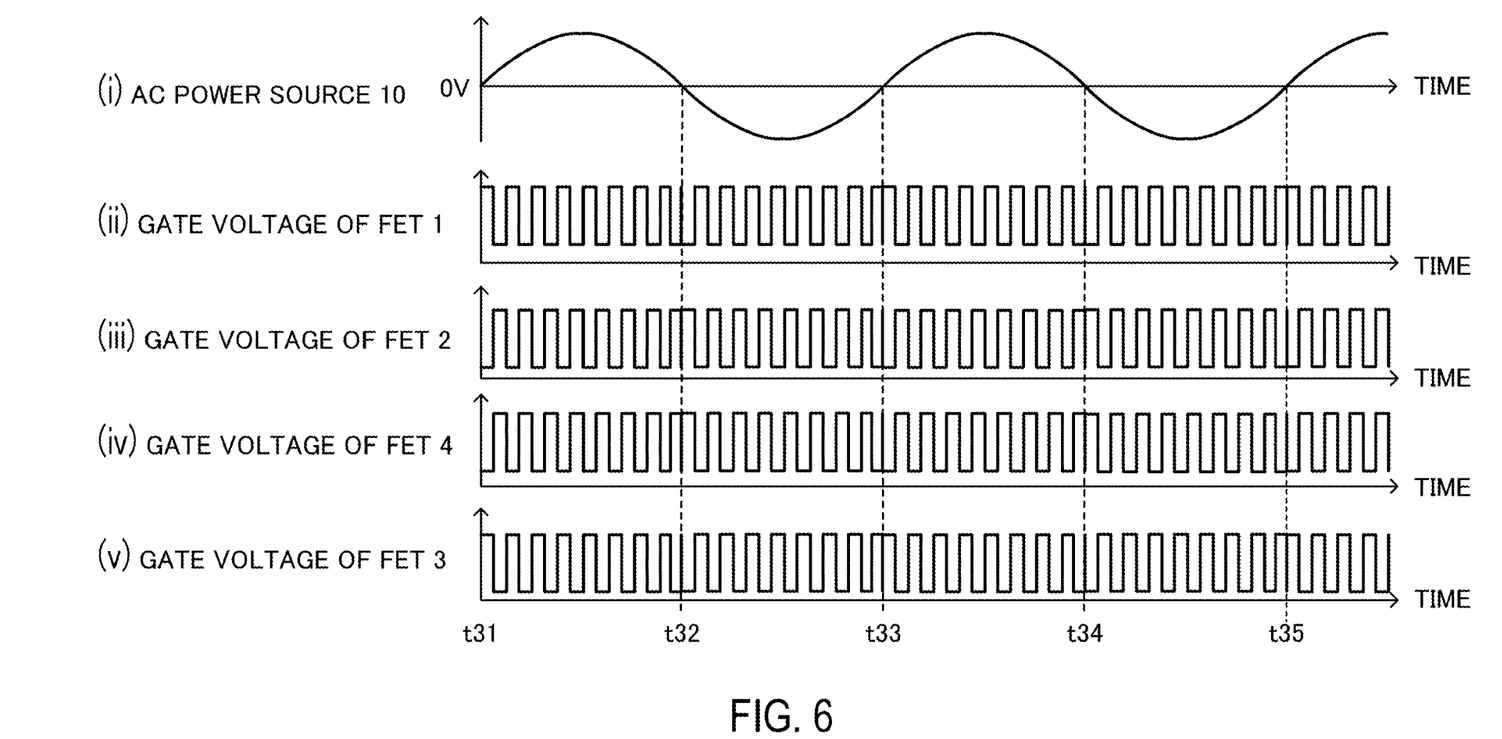
FIG. 6 is a view illustrating a control method of a switching power source of an Embodiment 2.

FIG. 6 is a graph, in which a horizontal axis represents time, illustrating a transition of the AC voltage of the AC power source 10 and the gate voltages of the FET1, the FET2, the FET3 and the FET4. In FIGS. 6, (i), (ii), (iii), (iv) and (v) are similar to (i), (ii), (iii), (iv) and (v) of FIG. 2, therefore descriptions on the graph will be omitted. Incidentally, as in FIG. 2, the voltage value of the AC power source 10 represents the potential of the LIVE phase viewed from the NEUTRAL phase. In addition, each of t31, t32, t33, t34 and t35 represents a timing.

Unlike the switching power source 100 of the Embodiment 1, in the switching power source 200 of the Embodiment 2, the FET1, the FET2, the FET3 and the FET4 are not turned ON for the long period corresponding to the half cycle of the cycle of the AC voltage of the AC power source 10. During the period when the instantaneous value of the AC voltage of the AC power source 10 is positive (from t31 to t32, from t33 to t34, etc.), the same control as in the Embodiment 1 is performed for the FET3 and the FET4. That is, the control portion 110 controls the FET4 in the complementary manner to FET3 while controlling the FET3 with the PWM at the frequency and the on-duty according to the load and the input voltage (the voltage value of the AC power source 10). On the other hand, the FET1 and the FET2 are controlled as following in the Embodiment 2. During the period when the instantaneous value of the AC voltage of the AC power source 10 is positive (from t31 to t32, from t33 to t34, etc.), the FET1 is controlled so as to be turned ON only during a period when the FET4 is turned OFF, and the FET2 is controlled so as to be turned ON only during a period when the FET3 is turned OFF.

Similarly, during the period when the instantaneous value of the AC voltage of the AC power source 10 is negative (from t32 to t33, from t34 to t35, etc.), the same control as in the Embodiment 1 is performed for the FET1 and the FET2. That is, the control portion 110 controls the FET2 in the complementary manner to FET1 while controlling the FET1 with the PWM at the frequency and the on-duty according to the load and the input voltage (the voltage value of the AC power source 10). On the other hand, the FET3 and the FET4 are controlled as following in the Embodiment 2. During the period when the instantaneous value of the AC voltage of the AC power source 10 is negative (from t32 to t33, from t34 to t35, etc.), the FET3 is controlled so as to be turned ON only during a period when the FET2 is turned OFF and the FET4 is controlled so as to be turned ON only during a period when the FET1 is turned OFF. Current flowing into the FET1, the FET2, the FET3 and the FET4 in the switching power source 200 will be as shown in FIG. 7 and FIG. 8.

[Current Flowing into the FET During the Active Clamp Operation]

Figure 7:
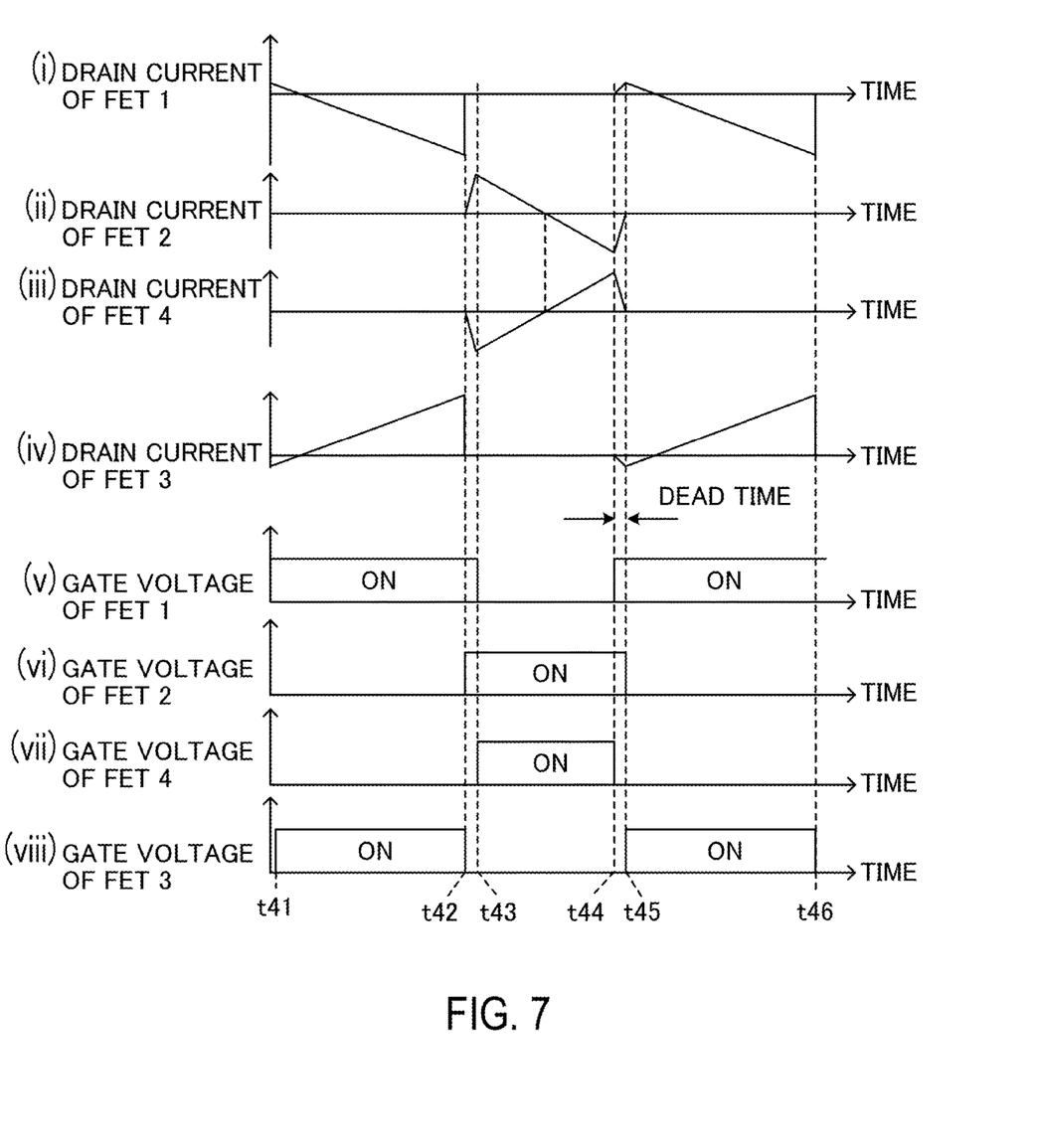
FIG. 7 is a view illustrating current waveforms and voltage waveforms of the switching power source of the Embodiment 2.
Figure 8:
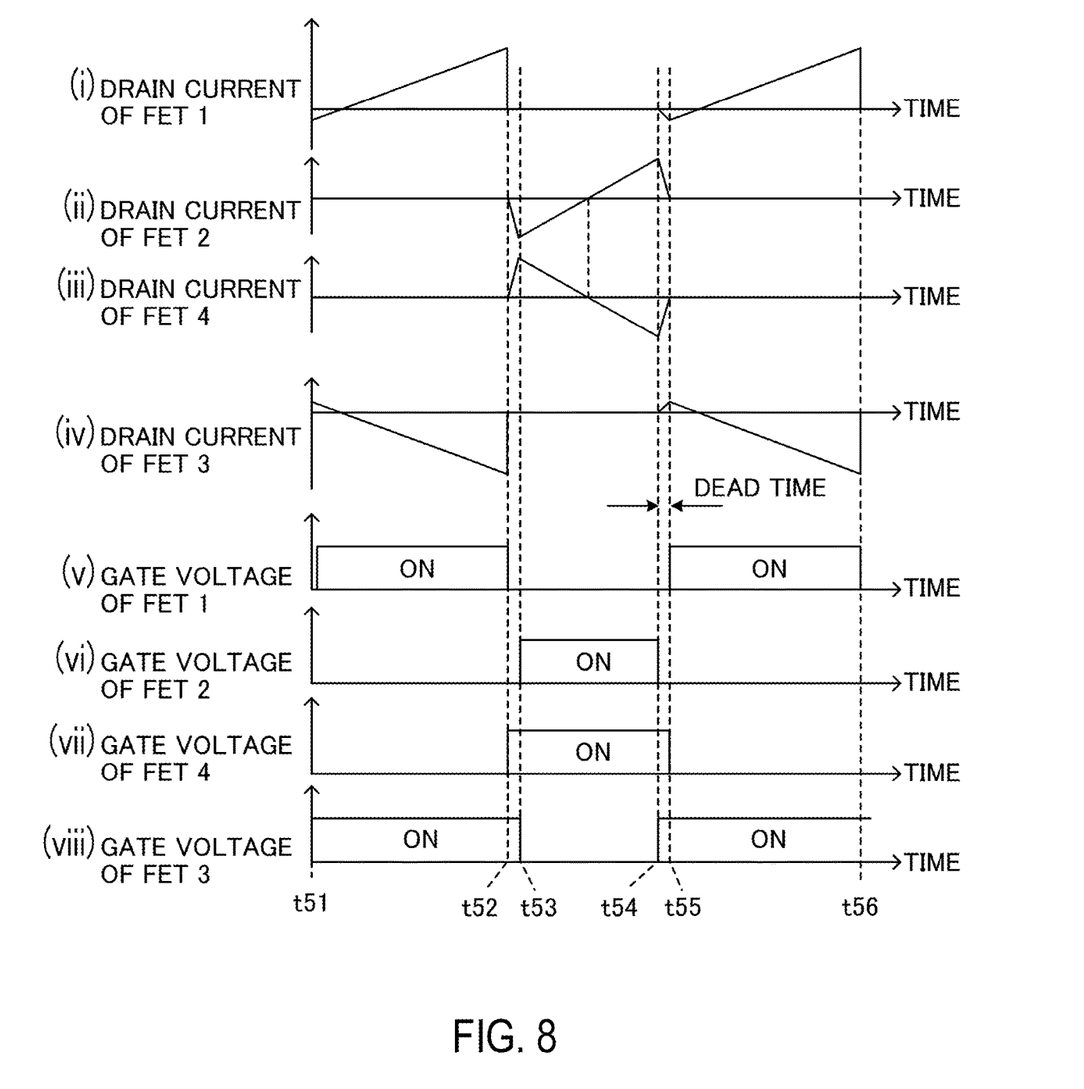
FIG. 8 is a view illustrating the current waveforms and the voltage waveforms of the switching power source of the Embodiment 2.

FIG. 7 and FIG. 8 illustrate, as in FIG. 4 and FIG. 5, the drain currents flowing into the FET1, the FET2, the FET3 and the FET4 and the gate voltages of each FET during an operation of the switching power source 200. In addition, each of t41, t42, t43, t44, t45 and t46 and each of t51, t52, t53, t54, t55 and t56 represents a timing.

FIG. 7 shows waveforms during the period when the AC voltage of the AC power source 10 is positive (from t31 to t32, from t33 to t34, etc.), and FIG. 8 shows waveforms during the period when the AC voltage of the AC power source 10 is negative (from t32 to t33, from t34 to t35, etc.). In a case where an effect of switching noise due to timing deviations in switching, etc. is ignored, the current flowing into the FET1, the FET2, the FET3 and the FET4 in the switching power source 200 is the same as in the switching power source 100 of the Embodiment 1, therefore detailed descriptions will be omitted. Unlike the switching power source 100 of the Embodiment 1, a reason why not performing the ON operation for the long period to the FET1, the FET2, the FET3 and the FET4 in the switching power source 200 will be explained below.

The reason why not performing the ON operation for the long period, which is an equivalent of the half cycle of the AC power source 10, in the switching power source 200 is to reduce power consumption in the drive circuits. In a case where the power source voltage generation circuit 1215 is configured as the drive circuit 121, current must be made flown through the diode D1211, the resistor R1211 as the FET1 is turned ON since an electric charge in the capacitor C1211 is consumed according to a duration the FET1 is turned ON. As a result, power loss occurs. Therefore, in the switching power source 100 that requires the FET1 to be turned ON for the long period, which is the half cycle of the AC power source 10, the power consumption of the diode D1211, the resistor R1211, and the FET1211 also becomes greater, and it is necessary to select an element with a large power rating. In addition, since a power source of the drive circuit 121 is one side phase of the AC power source 10, the drive circuit 121 can only charge the capacitor C1211 in the half cycle of the AC power source 10. In addition, in the control of the switching power source 100 of the Embodiment 1, it is required to operate the drive circuit 121 for a long time during a period when the capacitor C1211 cannot be charged, therefore a capacity of the capacitor C1211 has to be made larger. Therefore, when the control in which the FET1, the FET2, the FET3 and the FET4 are turned ON for a long time as in the switching power source 100 of the Embodiment 1 is performed, the power consumption of the drive circuit 121 may become large, and cost and an area of the drive circuit 121 may increase.

By the way, in the Embodiment 1, it was described that it was possible to configure the active clamp circuit by leaving the FET1 and the FET2 or the FET3 and the FET4 turned ON according to the positive or the negative of the instantaneous value of the AC voltage of the AC power source 10. In practice, it is not necessary to leave the FET1 and the FET2 or the FET3 and the FET4 turned ON for the long period about the half cycle of the AC power source 10 in order to realize the active clamp operation.

Focusing on the FET1 as an example, as it can be seen from FIG. 4 and FIG. 5, the current does not always flow into the drain terminal of the FET1 during the period when the FET1 is kept turned ON in the switching power source 100 of the Embodiment 1 (from t12 to t14 in (i) of FIG. 4). It is the following periods when the current flows into the FET1 in the period when the instantaneous value of the AC voltage of the AC power source 10 is positive. That is, only a period when the FET3, which is controlled as the low-side FET, is turned ON (from t11 to t12, and from t15 to to 16 in FIG. 4) and a period of the dead time just before the FET3 is turned ON (from t14 to t15) (see (i) of FIG. 4). Therefore, in a case where a design that takes into consideration of the switching noise of the FET1 is possible, the active clamp operation becomes possible with the switching power source 200 by turning on the FET1 during the period when the FET2 is not turned ON.

By controlling the FET1, the FET2, the FET3 and the FET4 in this manner, a total ON-time of the FET1 in the period when the AC power source 10 is positive can be reduced compared to the case where the FET1 is always kept turned ON. Therefore, the switching power source 200 of the Embodiment 2 can drive the FET with a low-cost and space-saving drive circuit.

As described above, according to the Embodiment 2, it is possible to configure an efficient switching power source without using diode bridges.

Embodiment 3

[Description of a Laser Beam Printer]

Figure 9:
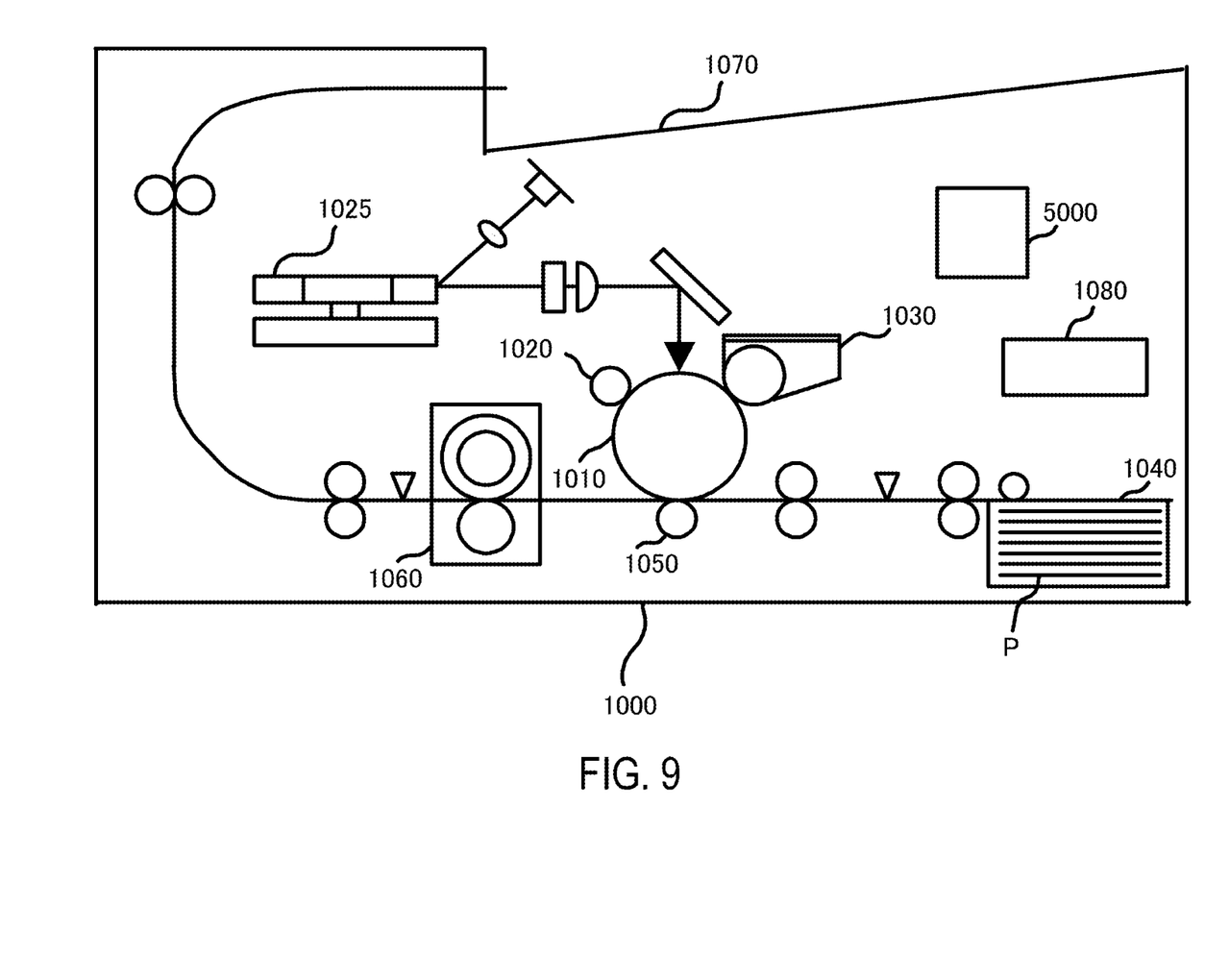
FIG. 9 is a view illustrating an image forming apparatus of an Embodiment 3.

FIG. 9 shows a schematic view of a laser beam printer as an example of an image forming apparatus. The laser beam printer 1000 (hereinafter referred to as a "printer 1000") is provided with a photosensitive drum 1010, a charging portion 1020, and a developing portion 1030. The photosensitive drum 1010 is an image bearing member on which an electrostatic latent image is formed. The charging portion 1020 uniformly charges the photosensitive drum 1010. An optical scanning device 1025, which is an exposure unit, forms the electrostatic latent image by scanning a laser beam on the photosensitive drum 1010 in accordance with image data. The developing portion 1030 forms a toner image by developing the electrostatic latent image formed on the photosensitive drum 1010 with toner. The toner image formed on the photosensitive drum 1010 (on the image bearing member) is transferred by a transfer portion 1050 to a sheet P as a recording material supplied from a cassette 1040, and an unfixed toner image transferred to the sheet P is fixed by a fixing unit 1060 and the sheet P is discharged to a tray 1070. The photosensitive drum 1010, the charging portion 1020, the developing portion 1030, and the transfer portion 1050 are an image forming portion. In addition, the printer 1000 is provided with a power source device 1080, and power is supplied from the power source device 1080 to a driving portion such as a motor, etc., and to a control portion 5000. In addition, the power is supplied from the power source device 1080 to a heating member (not shown in FIG. 9) provided in the fixing device 1060. The switching power source 100 of the Embodiment 1 and the switching power source 200 of the Embodiment 2 can be used for the power source device 1080. In other words, in a case of a configuration where power is supplied from the switching power source 100 or from the switching power source 200 to the fixing unit 1060, the heated member S1 described in FIG. 1 or FIG. 3 will correspond to the heating member of the fixing unit 1060.

The control portion 5000 is provided with a CPU (not shown) and controls an image forming operation by the image forming portion, a conveyance operation of the sheet P, temperature of the fixing unit 1060, etc. The control portion 5000 may perform the controls of the control portion 110 of the Embodiment 1 and the Embodiment 2. When a predetermined time elapses after a printing operation is finished, the printer 1000 transits to a standby state in which the printing operation can be performed immediately. After another predetermined time elapses, the printer 1000 transits from the standby state to a sleep state, which is a low power consumption mode, in order to reduce power consumption during standby. The printer 1000 has three states: the sleep state and the standby state, which is a second mode, and a print state, which is a first mode, and the control portion 5000 makes the printer transit to each state. Incidentally, the image forming apparatus to which the switching power source 100 of the Embodiment 1 and the switching power source 200 of the Embodiment 2 can be applied is not limited to the configuration illustrated in FIG. 9.

As described above, even in the Embodiment 3, it is possible to configure an efficient switching power source without using diode bridges.

According to the present invention, it is possible to configure an efficient switching power source without using diode bridges.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-145073 filed on Sep. 13, 2022, which is hereby incorporated by reference herein in its entirety.

What is claimed is:

1. A power source device comprising:
   a first switching element of which a first terminal is connected to a path of a first polarity of an AC power source;
   a second switching element of which a first terminal is connected to a second terminal of the first switching element;
   a third switching element of which a first terminal is connected to a path of a second polarity of the AC power source;
   a fourth switching element of which a first terminal is connected to a second terminal of the third switching element;
   a first capacitor connected between the first terminal and the second terminal of the first switching element;
   a second capacitor serially connected between the second terminal of the second switching element and the second terminal of the fourth switching element;
   a third capacitor connected between the first terminal and the second terminal of the third switching element;
   a fourth capacitor connected between the path of the first polarity and the path of the second polarity;
   a detecting portion configured to detect which of the path of the first polarity and the path of the second polarity is higher potential;
   a control portion configured to control the first switching element, the second switching element, the third switching element and the fourth switching element based on a detecting result by the detecting portion; and
   an inductive load connected between the second terminal of the first switching element and the second terminal of the third switching element.

2. A power source device according to claim 1, wherein the inductive load includes an inductor on a primary side and a heated member, insulated from the inductor, on a secondary side.

3. A power source device according to claim 1, wherein the inductive load includes a transformer having a primary winding and a secondary winding.

4. A power source device according to claim 1, wherein the first switching element, the second switching element, the third switching element and the fourth switching element are N channel metal oxide film semiconductor field effect transistors,
   wherein the first terminals of the first switching element, the second switching element, the third switching element and the fourth switching element are source terminals of the metal oxide film semiconductor field effect transistors, and
   wherein the second terminals of the first switching element, the second switching element, the third switching element and the fourth switching element are drain terminals of the metal oxide film semiconductor field effect transistors.

5. A power source device according to claim 1, wherein the first switching element, the second switching element, the third switching element and the fourth switching element are N channel insulated gate bipolar transistors,
   wherein the first terminals of the first switching element, the second switching element, the third switching element and the fourth switching element are emitter terminals of the insulated gate bipolar transistors,
   wherein the second terminals of the first switching element, the second switching element, the third switching element and the fourth switching element are collector terminals of the insulated gate bipolar transistors,
   wherein between the emitter terminals and the collector terminals of the insulated gate bipolar transistors, diodes are connected in parallel, respectively,
   wherein anode terminals of the diodes are connected to the emitter terminals of the insulated gate bipolar transistors, and
   wherein cathode terminals of the diodes are connected to the collector terminals of the insulated gate bipolar transistors.

6. A power source device according to claim 1, wherein during a period when a potential of the path of the first polarity is higher than a potential of the path of the second polarity, the control portion controls so as to maintain the first switching element and the second switching element in an ON state and controls so that the third switching element and the fourth switching element become in the ON state or an OFF state alternately, being provided with a dead time when both two switching elements are in the OFF state, and wherein during a period when the potential of the path of the second polarity is higher than the potential of the path of the first polarity, the control portion controls so as to maintain the third switching element and the fourth switching element in the ON state and controls so that the first switching element and the second switching element become in the ON state or the OFF state alternately, being provided with the dead time.

7. A power source device according to claim 1, wherein during a period when a potential of the path of the first polarity is higher than a potential of the path of the second polarity, the control portion controls so that the third switching element and the fourth switching element become in an ON state or an OFF state alternately, being provided with a dead time when both two switching elements are in the OFF state, controls the first switching element so as to become in the ON state or the OFF state opposite to the state of the fourth switching element and controls the second switching element so as to become in the ON state or the OFF state opposite to the state of the third switching element, and wherein during a period when the potential of the path of the second polarity is higher than the potential of the path of the first polarity, the control portion controls so that the first switching element and the second switching element become in the ON state or the OFF state alternately, being provided with the dead time, controls the third switching element so as to become in the ON state or the OFF state opposite to the state of the second switching element and controls the fourth switching element so as to become in the ON state or the OFF state opposite to the state of the first switching element.

8. A power source device according to claim 1, wherein the detecting portion detects an instantaneous value of an AC voltage of the AC power source.

9. A power source device according to claim 1, wherein the detecting portion detects a zero-cross point where a potential of the path of the first polarity transits from a higher state to a lower state than a potential of the path of the second polarity, or the detecting portion detects a zero-cross point where a potential of the path of the first polarity transits from the lower state to the higher state than the potential of the path of the second polarity, and a phase of an AC voltage of the AC power source.

10. A power source device according to claim 1, wherein the control portion controls a switching frequency to control an ON state or an OFF state of the first switching element, the second switching element, the third switching element and the fourth switching element based on at least the load and a detecting result by the detecting portion.

11. A power source device according to claim 10, further comprising a temperature detecting unit configured to detect a temperature of the load, wherein the control portion controls the switching frequency based on a detecting result by the temperature detecting unit.

12. An image forming apparatus for forming an image on a recording material comprising a power source device, wherein the power source device includes:

a first switching element of which a first terminal is connected to a path of a first polarity of an AC power source;

a second switching element of which a first terminal is connected to a second terminal of the first switching element;

a third switching element of which a first terminal is connected to a path of a second polarity of the AC power source;

a fourth switching element of which a first terminal is connected to a second terminal of the third switching element;

a first capacitor connected between the first terminal and the second terminal of the first switching element;

a second capacitor serially connected between the second terminal of the second switching element and the second terminal of the fourth switching element;

a third capacitor connected between the first terminal and the second terminal of the third switching element;

a fourth capacitor connected between the path of the first polarity and the path of the second polarity;

a detecting portion configured to detect which of the path of the first polarity and the path of the second polarity is higher potential;

a control portion configured to control the first switching element, the second switching element, the third switching element and the fourth switching element based on a detecting result by the detecting portion; and an inductive load connected between the second terminal of the first switching element and the second terminal of the third switching element.

13. An image forming apparatus according to claim 12, wherein the inductive load includes an inductor on a primary side and a heated member, insulated from the inductor, on a secondary side.

14. An image forming apparatus according to claim 12, wherein the inductive load includes a transformer having a primary winding and a secondary winding.

15. An image forming apparatus according to claim 12, wherein the first switching element, the second switching element, the third switching element and the fourth switching element are N channel metal oxide film semiconductor field effect transistors, wherein the first terminals of the first switching element, the second switching element, the third switching element and the fourth switching element are source terminals of the metal oxide film semiconductor field effect transistors, and wherein the second terminals of the first switching element, the second switching element, the third switching element and the fourth switching element are drain terminals of the metal oxide film semiconductor field effect transistors.

16. An image forming apparatus according to claim 12, wherein the first switching element, the second switching element, the third switching element and the fourth switching element are N channel insulated gate bipolar transistors, wherein the first terminals of the first switching element, the second switching element, the third switching element and the fourth switching element are emitter terminals of the insulated gate bipolar transistors, wherein the second terminals of the first switching element, the second switching element, the third switching element and the fourth switching element are collector terminals of the insulated gate bipolar transistors, wherein between the emitter terminals and the collector terminals of the insulated gate bipolar transistors, diodes are connected in parallel, respectively, wherein anode terminals of the diodes are connected to the emitter terminals of the insulated gate bipolar transistors, and wherein cathode terminals of the diodes are connected to the collector terminals of the insulated gate bipolar transistors.

17. An image forming apparatus according to claim 12, wherein during a period when a potential of the path of the first polarity is higher than a potential of the path of the second polarity, the control portion controls so as to maintain the first switching element and the second switching element in an ON state and controls so that the third switching element and the fourth switching element become in the ON state or an OFF state alternately, being provided with a dead time when both two switching elements are in the OFF state, and wherein during a period when the potential of the path of the second polarity is higher than the potential of the path of the second polarity, the control portion controls so as to maintain the third switching element and the fourth switching element in the ON state and controls so that the first switching element and the second switching element become in the ON state or the OFF state alternately, being provided with the dead time.

18. An image forming apparatus according to claim 12, wherein during a period when a potential of the path of the first polarity is higher than a potential of the path of the second polarity, the control portion controls so that the third switching element and the fourth switching element become in an ON state or an OFF state alternately, being provided with a dead time when both two switching elements are in the OFF state, controls the first switching element so as to become in the ON state or the OFF state opposite to the state of the fourth switching element and controls the second switching element so as to become in the ON state or the OFF state opposite to the state of the third switching element, and wherein during a period when the potential of the path of the second polarity is higher than the potential of the path of the first polarity, the control portion controls so that the first switching element and the second switching element become in the ON state or the OFF state alternately, being provided with the dead time, controls the third switching element so as to become in the ON state or the OFF state opposite to the state of the second switching element and controls the fourth switching element so as to become in the ON state or the OFF state opposite to the state of the first switching element.

19. An image forming apparatus according to claim 12, wherein the detecting portion detects an instantaneous value of an AC voltage of the AC power source.

20. An image forming apparatus according to claim 12, wherein the detecting portion detects a zero-cross point where a potential of the path of the first polarity transits from a higher state to a lower state than a potential of the path of the second polarity, or the detecting portion detects a zero-cross point where a potential of the path of the first polarity transits from the lower state to the higher state than the potential of the path of the second polarity, and a phase of an AC voltage of the AC power source.

21. An image forming apparatus according to claim 12, wherein the control portion controls a switching frequency to control an ON state or an OFF state of the first switching element, the second switching element, the third switching element and the fourth switching element based on at least the load and a detecting result by the detecting portion.

22. An image forming apparatus according to claim 21, further comprising a temperature detecting unit configured to detect a temperature of the load, wherein the control portion controls the switching frequency based on a detecting result by the temperature detecting unit.

\* \* \* \* \*